US010359787B2

(12) United States Patent
Chen

(10) Patent No.: US 10,359,787 B2
(45) Date of Patent: Jul. 23, 2019

(54) TWO-WAY FLOW CONTROL VALVE

(71) Applicants:Pao-Tang Chen, Lukang Township, Changhua County (TW); Hung-Shan Chen, Lukang Township, Changhua County (TW)

(72) Inventor: Chi-Fu Chen, Lukang Township (TW)

(73) Assignees: Pao-Tang Chen (TW); Hung-Shan Chen (TW)

( * ) Notice: Subject to any disclaimer, the term of this patent is extended or adjusted under 35 U.S.C. 154(b) by 99 days.

(21) Appl. No.: 15/729,702

(22) Filed: Oct. 11, 2017

(65) Prior Publication Data

US 2019/0107849 A1 Apr. 11, 2019

(51) Int. Cl.
*G05D 7/01* (2006.01)
*F16K 7/17* (2006.01)
*E03C 1/02* (2006.01)
*E03C 1/04* (2006.01)

(52) U.S. Cl.
CPC .............. *G05D 7/012* (2013.01); *F16K 7/17* (2013.01); *E03C 1/04* (2013.01); *E03C 2001/026* (2013.01)

(58) Field of Classification Search
CPC .............. F16L 55/027; Y10T 137/7888; Y10T 137/7869; Y10T 137/7668; Y10T 137/7792; G05D 7/012; F16K 7/17
USPC .......... 138/45, 46; 254/120; 137/454.6, 517, 137/601.18
See application file for complete search history.

(56) References Cited

U.S. PATENT DOCUMENTS

| 3,138,177 | A | * | 6/1964 | Cutler | A47L 15/4217 137/504 |
| 4,248,270 | A | * | 2/1981 | Ostrowski | F16K 31/404 137/504 |
| 4,609,014 | A | * | 9/1986 | Jurjevic | G05D 7/012 137/504 |
| 4,667,700 | A | * | 5/1987 | Buzzi | F16K 17/34 137/517 |
| 4,883,093 | A | * | 11/1989 | Miles | F16L 55/027 138/45 |
| 5,487,528 | A | * | 1/1996 | Richmond | F16K 31/404 138/42 |
| 2006/0086393 | A1 | * | 4/2006 | Bailey | G05D 7/012 137/601.18 |

* cited by examiner

*Primary Examiner* — Patrick F Brinson
(74) *Attorney, Agent, or Firm* — Alan D. Kamrath; Mayer & Williams PC

(57) ABSTRACT

A two-way flow control valve includes a valve body, a control member, a cover mounted and a gasket. The valve body has a first water hole, a plurality of first ribs and a plurality of first flanges. The cover has a second water hole, a plurality of second ribs and a plurality of second flanges. The control member has a passage. The control member is provided with two V-shaped inclined planes which are clamped respectively by the first flanges of the valve body and the second flanges of the cover. When the water passing through the two-way flow control valve is large enough to reach a determined value, the control member is stretched and deformed to reduce the diameter of the passage, and to partially block the first water hole of the valve body or the second water hole of the cover.

7 Claims, 5 Drawing Sheets

TWO-WAY FLOW CONTROL VALVE

BACKGROUND OF THE INVENTION

1. Field of the Invention

The present invention relates to a valve and, more particularly, to a two-way flow control valve.

2. Description of the Related Art

A conventional flow valve comprises a water-outflow seat body comprising an outer seat circular wall portion, a water-outflow middle seat portion, a plurality of stopping wall portions disposed between the outer seat circular wall portion and the water-outflow middle seat portion, a water-storage circular slot portion disposed between the stopping wall portions and the water-outflow middle seat portion, a position-limiting clamping portion disposed inside the outer seat circular wall portion, a seat top surface disposed on top of the water-outflow middle seat portion, a plurality of water-inflow openings recessed on top of the seat top surface, and a water-outflow opening centrally penetrated through the water-outflow middle seat portion; at least one water-barrier sheet body fixedly clamped in between the water-outflow middle seat portion and the stopping wall portions of the water-outflow seat body, comprising a centrally-disposed water-conducting opening corresponding to the water-outflow opening of the water-outflow seat body, an elastic stopping portion outwardly extended from a peripheral ring of the water-conducting opening, and a fixed ring disposed on an outermost ring of the elastic stopping portion; and a water-entry cover body covered on the water-outflow seat body, comprising a centrally-disposed water-entry opening corresponding to the water-conducting opening of the water-barrier sheet body and a lower peripherally-disposed compression ring compressively engaged in between the position-limiting clamping portion and the outer seat circular wall portion of the water-outflow seat body. However, the water flow can only enter the water-saving device structure from the water-entry cover body, and the water flow direction is restricted, so that the flow valve is mounted and operated in a single direction and cannot be operated when being mounted reversely. In addition, the water-barrier sheet body is not positioned, so that the water-barrier sheet body is deflected easily due to an impact of the water flow, thereby affecting the effect of flow control. Further, the water-barrier sheet body is not positioned, so that the water-barrier sheet body easily falls out of the water-outflow opening due to the impact of a strong water flow, thereby failing the flow control effect completely.

BRIEF SUMMARY OF THE INVENTION

The primary objective of the present invention is to provide a two-way flow control valve that regulates the water flow rate in two directions.

In accordance with the present invention, there is provided a two-way flow control valve comprising a valve body, a control member mounted in the valve body, a cover mounted in the valve body, and a gasket mounted outside of the valve body. The valve body has a bottom having a central position provided with a first water hole which has a periphery provided with a plurality of first ribs. The valve body is provided with a plurality of first flanges surrounding the first water hole. The cover has a bottom having a central position provided with a second water hole which has a periphery provided with a plurality of second ribs. The cover is provided with a plurality of second flanges surrounding the second water hole. The control member has a central position provided with a passage. The control member is sandwiched between the valve body and the cover and is provided with two substantially V-shaped inclined planes which are clamped respectively by the first flanges of the valve body and the second flanges of the cover. The two inclined planes of the control member are formed on a top and a bottom of the control member respectively. When a water flow passing through the two-way flow control valve is large enough to reach a determined value, the control member is stretched and deformed to reduce a diameter of the passage, and to partially block the first water hole of the valve body or the second water hole of the cover.

According to the primary advantage of the present invention, the flow rate out of the two-way flow control valve is kept at a constant value under any water pressure, so that the two-way flow control valve saves the water efficiently and keeps the flow rate at a constant value.

According to another advantage of the present invention, the control member is clamped by the first flanges of the valve body and the second flanges of the cover, so that the control member will not be deflected.

According to a further advantage of the present invention, the control member is encompassed by the first ribs of the valve body and the second ribs of the cover, so that the control member will not be detached from the valve body and the cover.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
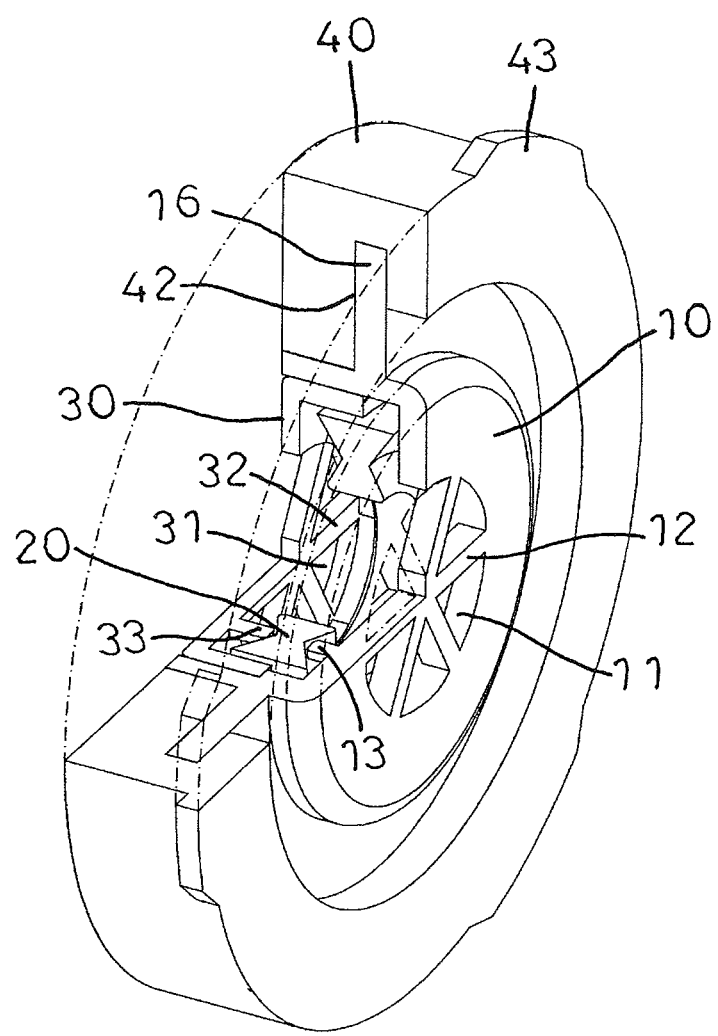
FIG. 1 is a perspective cross-sectional assembly view of a two-way flow control valve in accordance with the preferred embodiment of the present invention.
Figure 2:
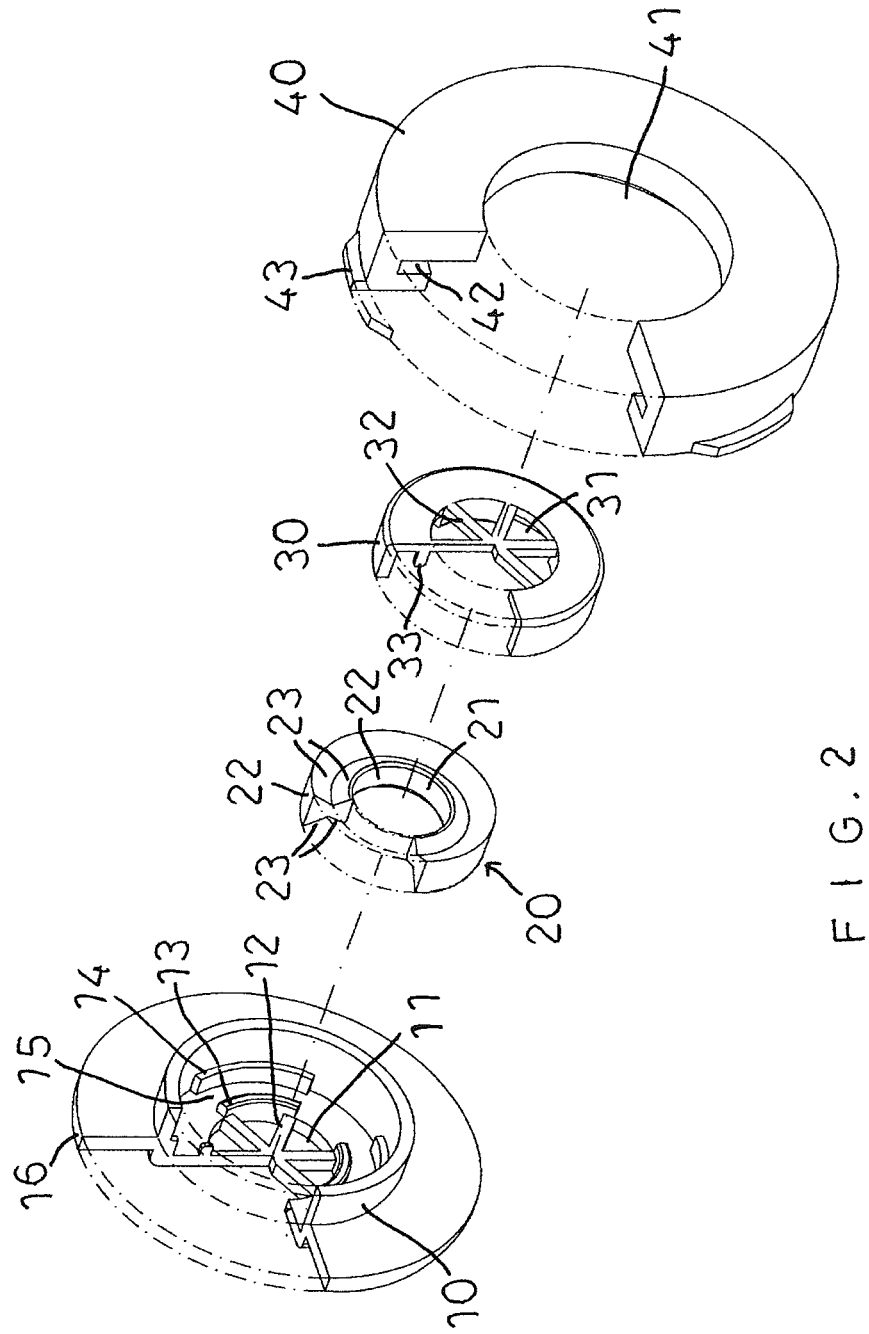
FIG. 2 is an exploded perspective view of the two-way flow control valve in accordance with the preferred embodiment of the present invention.
Figure 3:
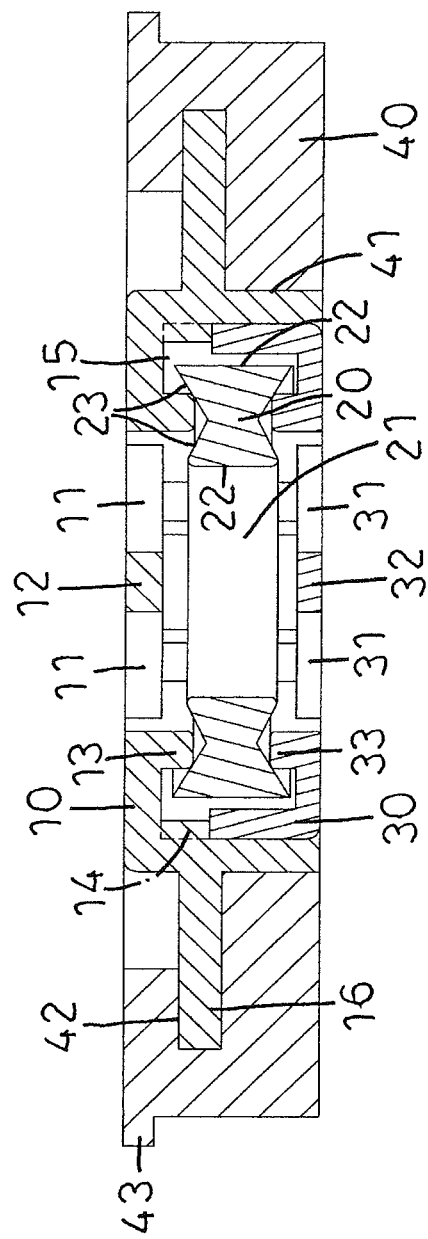
FIG. 3 is a cross-sectional assembly view of the two-way flow control valve in accordance with the preferred embodiment of the present invention.

Referring to the drawings and initially to FIGS. 1-3, a two-way flow control valve in accordance with the preferred embodiment of the present invention comprises a valve body 10, a control member 20 mounted in the valve body 10, a cover 30 mounted in the valve body 10, and a gasket 40 mounted outside of the valve body 10.

The valve body 10 has a hollow interior to receive the control member 20 and the cover 30. The valve body 10 has a bottom having a central position provided with a first water hole 11 which has a periphery provided with a plurality of first ribs 12. The valve body 10 is provided with a plurality of first flanges 13 surrounding the first water hole 11. The first flanges 13 of the valve body 10 are arranged equidistantly.

The cover 30 has a bottom having a central position provided with a second water hole 31 which has a periphery provided with a plurality of second ribs 32. The cover 30 is provided with a plurality of second flanges 33 surrounding the second water hole 31 and aligning with the first flanges 13 of the valve body 10. The second flanges 33 of the cover 30 are arranged equidistantly.

The control member 20 has an annular shape and has a central position provided with a passage 21. The control member 20 is sandwiched between the valve body 10 and the cover 30 and is provided with two substantially V-shaped inclined planes 23 which are clamped respectively by the first flanges 13 of the valve body 10 and the second flanges 33 of the cover 30. The two inclined planes 23 of the control member 20 are formed on a top and a bottom of the control member 20 respectively. In practice, when a water flow passing through the two-way flow control valve is large enough to reach a determined value, the control member 20 is stretched and deformed to reduce a diameter of the passage 21, and to partially block the first water hole 11 of the valve body 10 or the second water hole 31 of the cover 30.

The gasket 40 has a central position provided with a through hole 41 which has an inner diameter matching an outer diameter of the valve body 10, so that the valve body 10 is inserted into and flush with the through hole 41 of the gasket 40. The gasket 40 has a perimeter provided with a plurality of wings 43 which are arranged equidistantly.

In the preferred embodiment of the present invention, the gasket 40 has an inner periphery provided with a retaining groove 42, and the valve body 10 has an outer periphery provided with a retaining projection 16 secured in the retaining groove 42 of the gasket 40.

In the preferred embodiment of the present invention, the valve body 10 is provided with a plurality of abutments 14 surrounding the first flanges 13, with a receiving space 15 being defined between the abutments 14 and the first flanges 13. The abutments 14 of the valve body 10 are arranged equidistantly. Each of the abutments 14 of the valve body 10 has an arcuate shape and has a height greater than that of each of the first flanges 13. Each of the first flanges 13 of the valve body 10 has an arcuate shape. The cover 30 has an outer diameter matching an inner diameter of the valve body 10 and is secured on the abutments 14 of the valve body 10.

In the preferred embodiment of the present invention, the control member 20 is made of flexible material. Preferably, the control member 20 is made of silicone or rubber.

In the preferred embodiment of the present invention, the gasket 40 is made of flexible material. Preferably, the gasket 40 is made of silicone or rubber.

In the preferred embodiment of the present invention, the control member 20 has a longitudinally cross-sectional profile with a shape of a necktie which has two flat faces 22 formed on two opposite sides thereof.

In the preferred embodiment of the present invention, the first ribs 12 of the valve body 10 are arranged equidistantly in a radiating manner and form a net shape, and the second ribs 32 of the cover 30 are arranged equidistantly in a radiating manner and form a net shape.

Figure 4:
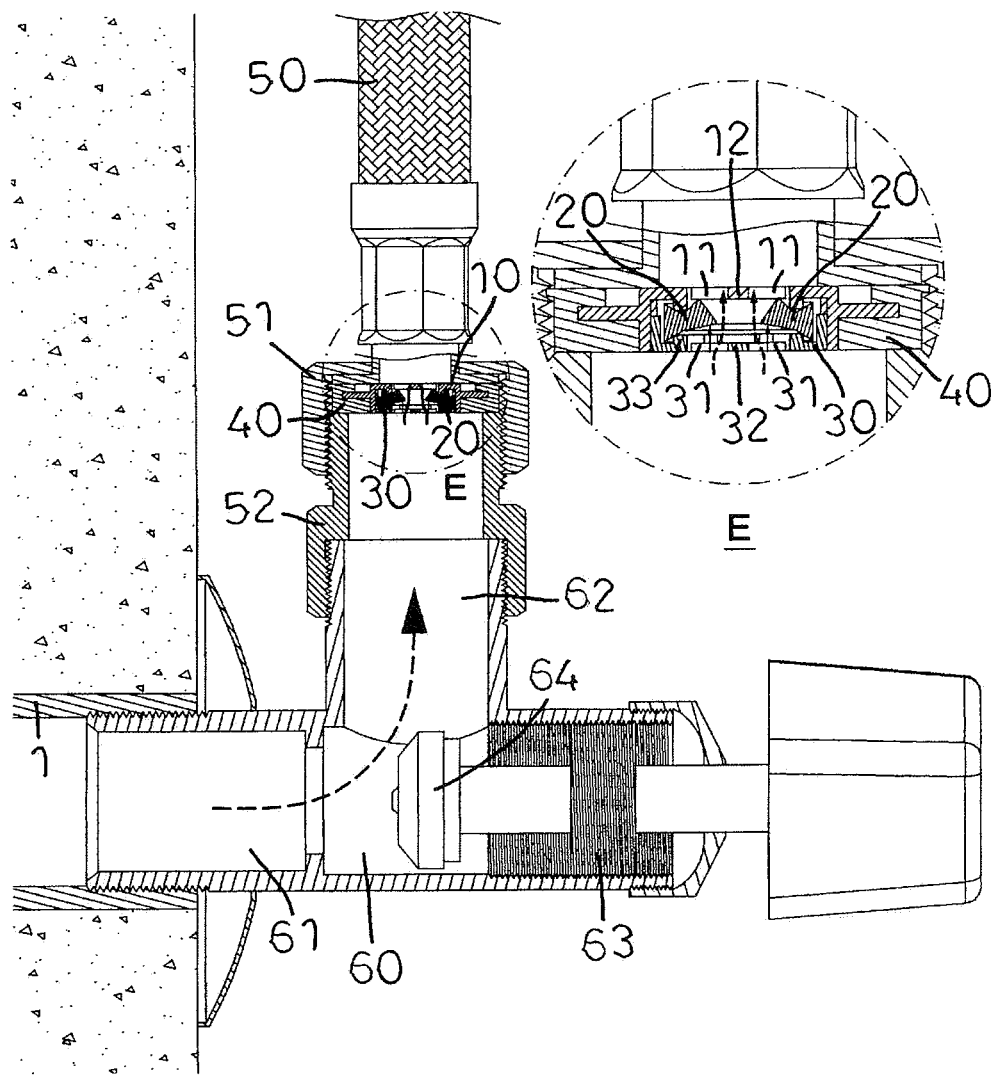
FIG. 4 is a schematic cross-sectional operational view of the two-way flow control valve, and a locally enlarged view taken along the circle "E".

In assembly, referring to FIG. 4, a water pipe 50 is mounted under a faucet (not shown) of a sink (not shown). A coupling 51 is mounted on the lower end of the water pipe 50. A water supply line 1 is mounted on the wall. A tee 60 is mounted between the water supply line 1 and the coupling 51. The tee 60 has a first tube 61 connected to the water supply line 1, a second tube 62 connected to the coupling 51 and a third tube 63 provided with a switch 64. The second tube 62 has a connector 52 connected with the coupling 51. The switch 64 is used to turn on or off the connection between the first tube 61 and the second tube 62. Thus, when the first tube 61 and the second tube 62 are connected, the water from the water supply line 1 in turn flows through the first tube 61, the second tube 62 and the water pipe 50 into the faucet. The two-way flow control valve is mounted between the connector 52 and the coupling 51.

In operation, referring to FIG. 4 with reference to FIGS. 1-3, the water flows into the second water hole 31 of the cover 30 and flows outward from the first water hole 11 of the valve body 10. In such a manner, when the flow pressure is at the normal state, the water from the water supply line 1 in turn flows through the first tube 61, the second tube 62, the second water hole 31 of the cover 30, the first water hole 11 of the valve body 10 and the water pipe 50 into the faucet. When the flow pressure is under an abnormal condition (the flow rate is large enough to exceed a determined value), the control member 20 is stretched upward and deformed to reduce the diameter of the passage 21, and to partially block the first water hole 11 of the valve body 10, so as to reduce the flow passing through the first water hole 11 of the valve body 10. Thus, when the flow is increased, the control member 20 reduces the flow, so that the flow rate out of the first water hole 11 of the valve body 10 is kept at a constant value whatever the water pressure is, thereby saving the water flow, and thereby controlling the flow rate.

Figure 5:
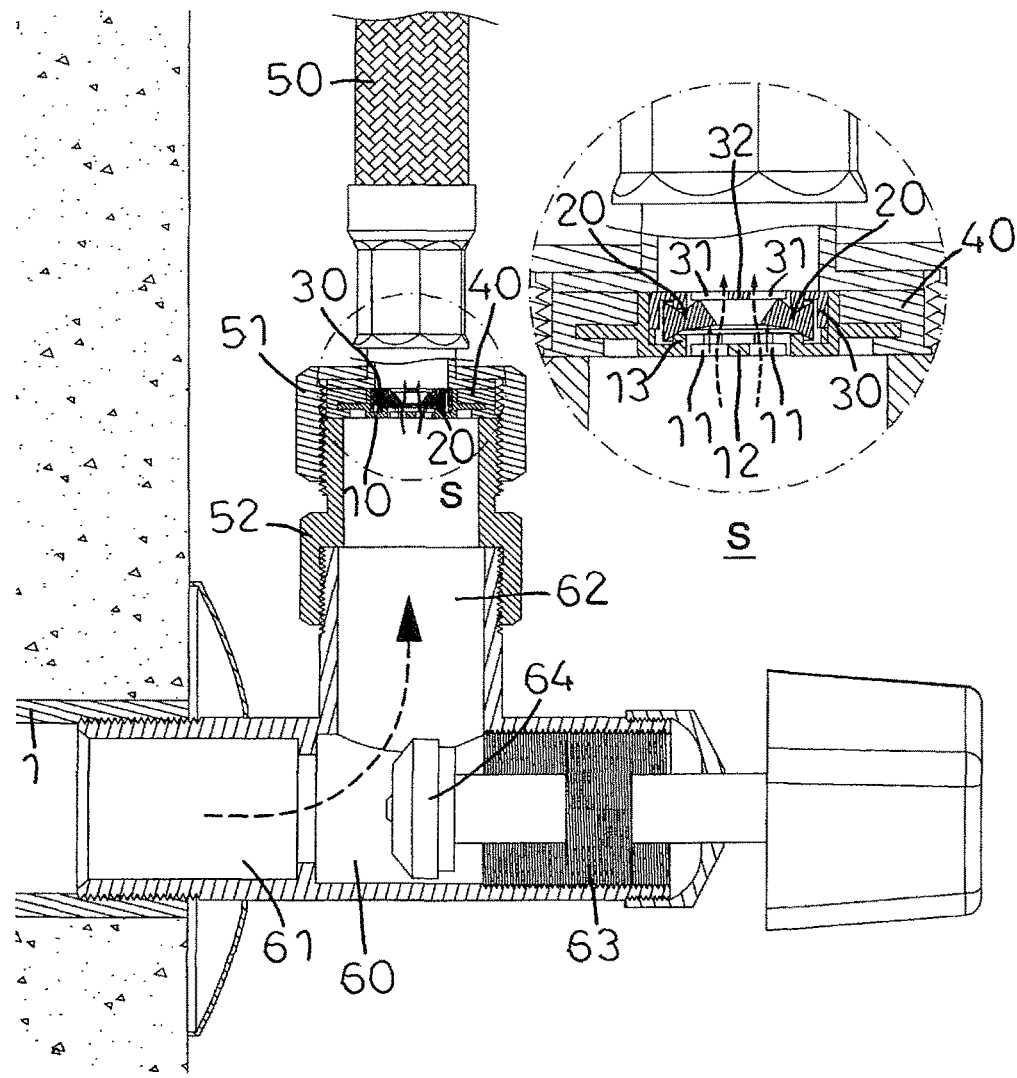
FIG. 5 is another schematic cross-sectional operational view of the two-way flow control valve, and a locally enlarged view taken along the circle "S".

Alternatively, referring to FIG. 5 with reference to FIGS. 1-3, the water flows into the first water hole 11 of the valve body 10 and flows outward from the second water hole 31 of the cover 30. In such a manner, when the flow pressure is at the normal state, the water from the water supply line 1 in turn flows through the first tube 61, the second tube 62, the first water hole 11 of the valve body 10, the second water hole 31 of the cover 30 and the water pipe 50 into the faucet. When the flow pressure is under an abnormal condition (the flow rate is large enough to exceed a determined value), the control member 20 is stretched upward and deformed to reduce the diameter of the passage 21, and to partially block the second water hole 31 of the cover 30, so as to reduce the flow passing through the second water hole 31 of the cover 30. Thus, when the flow is increased, the control member 20 reduces the flow, so that the flow rate out of the second water hole 31 of the cover 30 is kept at a constant value whatever the water pressure is, thereby saving the water flow, and thereby controlling the flow rate.

Accordingly, the flow rate out of the two-way flow control valve is kept at a constant value under any water pressure, so that the two-way flow control valve saves the water efficiently and keeps the flow rate at a constant value. In addition, the control member 20 is clamped by the first flanges 13 of the valve body 10 and the second flanges 33 of the cover 30, so that the control member 20 will not be deflected. Further, the control member 20 is encompassed by the first ribs 12 of the valve body 10 and the second ribs 32 of the cover 30, so that the control member 20 will not be detached from the valve body 10 and the cover 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A two-way flow control valve comprising:
   a valve body;
   a control member mounted in the valve body;
   a cover mounted in the valve body; and
   a gasket mounted outside of the valve body;
   wherein:
   the valve body has a bottom having a central position provided with a first water hole which has a periphery provided with a plurality of first ribs extending across the first water hole;
   the valve body is provided with a plurality of first flanges surrounding the first water hole;
   the cover has a bottom having a central position provided with a second water hole which has a periphery provided with a plurality of second ribs extending across the second water hole;
   the cover is provided with a plurality of second flanges surrounding the second water hole;
   the control member has a central position provided with a passage;
   the control member is sandwiched between the valve body and the cover and is provided with two substantially V-shaped inclined planes which are clamped respectively by the first flanges of the valve body and the second flanges of the cover;
   the two inclined planes of the control member are formed on a top and a bottom of the control member respectively; and
   when a water flow passing through the two-way flow control valve is large enough to reach a determined value, the control member is stretched and deformed to reduce a diameter of the passage, and to partially block the first water hole of the valve body or the second water hole of the cover.

2. The two-way flow control valve of claim 1, wherein the gasket has an inner periphery provided with a retaining groove, and the valve body has an outer periphery provided with a retaining projection secured in the retaining groove of the gasket.

3. The two-way flow control valve of claim 1, wherein:
   the valve body is provided with a plurality of abutments surrounding the first flanges, with a receiving space being defined between the abutments and the first flanges;
   each of the abutments of the valve body has an arcuate shape and has a height greater than that of each of the first flanges; and
   the cover has an outer diameter matching an inner diameter of the valve body and is secured on the abutments of the valve body.

4. The two-way flow control valve of claim 1, wherein the control member is made of silicone or rubber.

5. The two-way flow control valve of claim 1, wherein the gasket is made of silicone or rubber.

6. The two-way flow control valve of claim 1, wherein the control member has a longitudinally cross-sectional profile with a shape of a necktie which has two flat faces formed on two opposite sides thereof.

7. The two-way flow control valve of claim 1, wherein the first ribs of the valve body are arranged equidistantly in a radiating manner and form a net shape, and the second ribs of the cover are arranged equidistantly in a radiating manner and form a net shape.

* * * * *